United States Patent
Bolz et al.

(10) Patent No.: US 6,456,086 B1
(45) Date of Patent: Sep. 24, 2002

(54) VOLTAGE MONITORING DEVICE FOR MONITORING TWO DIFFERENT SUPPLY VOLTAGES RECEIVED BY AN ELECTRONIC COMPONENT

(75) Inventors: Stephan Bolz, Pfatter; Alfons Fisch, Falkenstein, both of (DE)

(73) Assignee: Siemens Aktiengesellschaft, Munich (DE)

( * ) Notice: Subject to any disclaimer, the term of this patent is extended or adjusted under 35 U.S.C. 154(b) by 54 days.

(21) Appl. No.: 09/677,434

(22) Filed: Oct. 2, 2000

Related U.S. Application Data

(63) Continuation of application No. PCT/DE99/00574, filed on Mar. 4, 1999.

(30) Foreign Application Priority Data

May 1, 1998 (DE) ......................................... 198 14 696

(51) Int. Cl.$^7$ ............................................... G01R 31/08
(52) U.S. Cl. ...................................... 324/522; 340/661
(58) Field of Search ............................... 324/433, 522; 340/636, 660, 661; 327/63, 69

(56) References Cited

U.S. PATENT DOCUMENTS

| | | | |
|---|---|---|---|
| 4,300,063 A | 11/1981 | Dunphy et al. | 327/63 |
| 5,254,971 A | 10/1993 | Sutterlin et al. | 340/458 |
| 5,438,270 A | 8/1995 | Harper et al. | 324/429 |

FOREIGN PATENT DOCUMENTS

DE   3612237 A1   10/1987

OTHER PUBLICATIONS

"Spannungsüberwachung und Watchdog–Funktionen auf einem Baustein", Design & Elektronik, 5$^{th}$ edition, Mar. 1, 1988, pp. 15 and 16.

Derwent Publication No. XP–002109012 (abstract) (No date).

*Primary Examiner*—Christine Oda
(74) *Attorney, Agent, or Firm*—Laurence A. Greenberg; Werner H. Stemer; Ralph E. Locher

(57) ABSTRACT

A voltage monitoring device for monitoring two different supply voltages to be received by an electronic component. The monitoring device has a ratiometrically operating analog/digital converter, whose reference input is supplied with the larger supply voltage and whose measurement input is supplied with the smaller supply voltage. An output signal of the analog/digital converter is supplied to a window comparator in which the output signal is compared with predetermined limit values. A reset signal for the electronic component is produced if the output signal is greater than the upper limit value or less than the lower limit value.

4 Claims, 1 Drawing Sheet

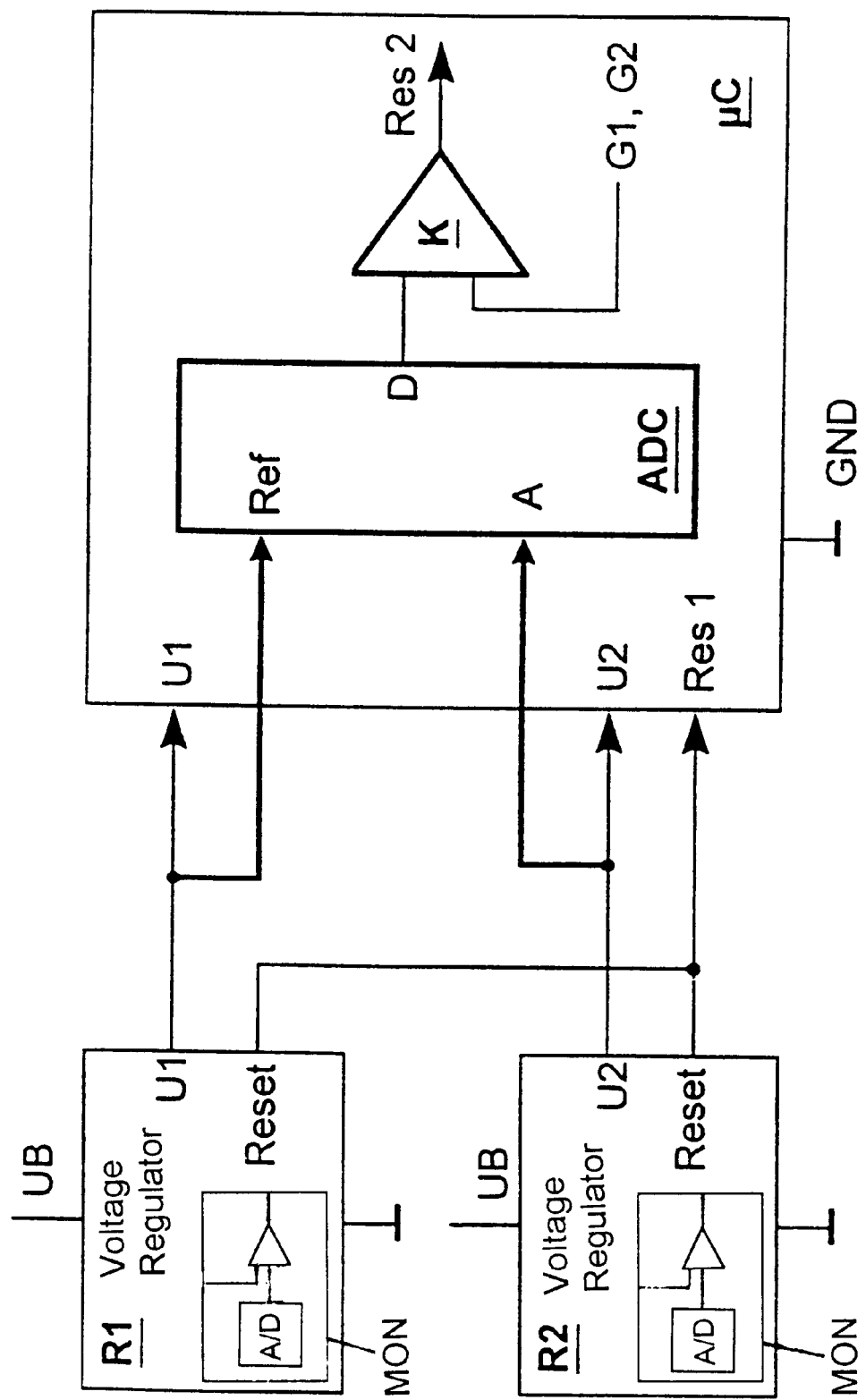

VOLTAGE MONITORING DEVICE FOR MONITORING TWO DIFFERENT SUPPLY VOLTAGES RECEIVED BY AN ELECTRONIC COMPONENT

CROSS REFERENCE TO RELATED APPLICATION

This is a continuation of copending International Application PCT/DE99/00574, filed Mar. 4, 1999, which designated the United States.

BACKGROUND OF THE INVENTION

Field of the Invention

The invention relates to a voltage monitoring device for monitoring two different supply voltages received by an electronic component.

The supply voltages required, for example, for a microcontroller are normally produced from an operating voltage by integrated voltage regulators.

Published, Non-Prosecuted German Patent Application DE 36 12 237 A1 discloses a configuration for monitoring voltages which are supplied via a multiplexer to an analog/digital converter and are compared in a microprocessor with stored limit values. The comparison result is displayed in a display apparatus.

A voltage monitoring IC which initiates a reset signal when the voltage to be monitored falls below a specific voltage level is known from the reference DE-Z "DESIGN&ELEKTRONIK" [Design and Electronics], Issue 5 dated Mar. 1, 1998, pages 13 and 16.

As a rule, integrated voltage regulators are equipped with an integrated voltage monitor—formed of an analog/digital converter and a comparator—and emit a reset signal if their output voltage, a supply voltage for the electronic component, is outside a defined voltage range.

Integration of the voltage monitors on the respective voltage regulator results in that linear independence between the output voltage and the voltage monitoring of each voltage regulator and the output voltages of the two voltage regulators is no longer ensured, since output voltage production and voltage monitoring of a voltage regulator use the same reference voltage, or the two regulators can produce different reference voltages. Errors resulting from unacceptably high drift of the reference voltage of one voltage regulator cannot be identified owing to joint use for voltage production and monitoring.

SUMMARY OF THE INVENTION

It is accordingly an object of the invention to provide a voltage monitoring device for monitoring two different supply voltages received by an electronic component which overcomes the above-mentioned disadvantages of the prior art devices of this general type, in which a linear independence between the output voltage and the voltage monitoring of a voltage regulator and the output voltages of the two voltage regulators is ensured.

With the foregoing and other objects in view there is provided, in accordance with the invention, a combination of an electronic component and a voltage monitoring device for monitoring two supply voltages including a larger supply voltage and a smaller supply voltage to be supplied to the electronic component. Each of the supply voltages is produced from an operating voltage supplied to a respective integrated voltage regulator and the respective integrated voltage regulator has a regulator voltage monitor for monitoring an output voltage of the respective integrated voltage regulator and the output voltage being one of the supply voltages supplied to the electronic component. The voltage monitoring device includes a ratiometrically operating analog/digital converter having a reference input receiving the larger supply voltage, a measurement input receiving the smaller supply voltage, and an output. The ratiometrically operating analog/digital converter generates a digital value provided at the output. A window comparator is connected to the ratiometrically operating analog/digital converter and receives the digital value. The window comparator compares the digital value with predetermined limit values including an upper limit value and a lower limit value, the window comparator generates a reset signal if the digital value is greater than the upper limit value or is less than the lower limit value.

In accordance with an added feature of the invention, the electronic component is a microcontroller and the ratiometrically operating analog/digital converter is integrated the microcontroller, and the window comparator is performed by software in the microcontroller.

With the foregoing and other objects in view there is provided, in accordance with the invention, a circuit formed of integrated voltage regulators receiving a supply voltage and outputting two supply voltages including a larger supply voltage and a smaller supply voltage. Each of the integrated voltage regulators has a voltage monitor for monitoring the supply voltages. The voltage monitor has an analog/digital converter and a window comparator connected to the analog/digital converter. The integrated voltage regulators output a reset signal if one of the supply voltages being monitored is outside of a defined voltage range. An electronic component includes a ratiometrically operating analog/digital converter having a reference input receiving the larger supply voltage, a measurement input receiving the smaller supply voltage, and an output. The ratiometrically operating analog/digital converter generates a digital value which is provided at the output. A further window comparator is connected to the ratiometrically operating analog/digital converter and receives the digital value. The further window comparator compares the digital value with predetermined limit values including an upper limit value and a lower limit value, further window comparator generates a further reset signal if the digital value is greater than the upper limit value or is less than the lower limit value.

In accordance with a concomitant feature of the invention, the electronic component is a microcontroller.

Other features which are considered as characteristic for the invention are set forth in the appended claims.

Although the invention is illustrated and described herein as embodied in a voltage monitoring device for monitoring two different supply voltages received an electronic component, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

The single FIGURE of the drawing is a block circuit diagram of a voltage monitoring device according to the invention.

DESCRIPTION OF THE PREFERRED EMBODIMENTS

Referring now to the single FIGURE of the drawing in detail, there is shown a microcontroller μC schematically as a box, which has connections for receiving two supply voltages U1, U2 (for example U1=5 V, U2=3.3 V) and a reference ground potential GND. The supply voltages U1, U2 are normally obtained from known, integrated voltage regulators R1, R2 from an operating voltage UB (for example 12 V), which must be greater than one of the two supply voltages U1, U2.

A voltage monitor MON is integrated in each voltage regulator R1, R2 and emits a reset signal if an output voltage—the supply voltage—leaves a defined voltage range, for example U1, U2±10%. Reset outputs of the two voltage regulators R1, R2 are connected to a reset input Res1 of the microcontroller μC, and are decoupled from one another in a manner not shown. The reset signal changes the microcontroller to a safe state (for example switched off).

The circuit described above corresponds to a known, conventional production of two different voltages.

In order to ensure linear independence between the output voltage and the voltage monitoring of each voltage regulator per se and the output voltages of the two voltage regulators, a further, ratiometrically operating analog/digital converter ADC is provided according to the invention, shown in bold in the drawing.

The particular advantage in the monitoring of the two supply voltages U1, U2 of the microcontroller μC (for, for example, U1, U2±5%) is that at least one ratiometrically operating analog/digital converter is already integrated in it.

A reference input Ref is supplied with the higher of the two output voltages (in this case U1 from the voltage regulator R1) as a reference voltage, while the lower output voltage U2 from the regulator R2 is supplied to an analog measurement input A.

A ratiometrically operating analog/digital converter simulates a ratio of the analog input voltage U2 to the reference voltage U1, that is to say U2/U1 in its value range of, for example, $2^{10}-1=1023$ steps digitally. A digital value D of the analog input value U2 that appears at the output of the analog/digital converter ADC, related to the value range of 1023 steps where:

$$D = U2/U1 = 1023 * \frac{3.3}{5} = 675 \text{ steps.}$$

The digital value D is compared in a downstream window comparator K, which can be represented by software in the microcontroller μC with predetermined limit values G1, G2 (for example G1=675+34=709 and G2=675−34=641, corresponding to a ratio $$U2/U1 = \frac{3.3}{5} \pm 5\%).$$

The ratio U2/U1 is thus then monitored to determine whether it is within the permissible range for the microcontroller μC. In the process, it is assumed that the probability of the two voltages drifting simultaneously in the same direction is negligibly low (exponentiation of uncorrelated probabilities).

If the ratio D of the two voltages leaves the predefined range (D>G1 or D<G2), then a reset signal Res2 appears at the output of a window comparator K, as a result of which the microcontroller μC is changed to a safe state, in the same way as by the reset signal Res1.

Since the supply voltage U2 is within the measurement range of U1 of the analog/digital converter ADC, there is no need for any voltage divider which, due to the tolerance of the components, would reduce the measurement accuracy.

The only error source in the voltage monitoring device according to the invention is the measurement accuracy of the analog/digital converter ADC, which, with a resolution of 10 bits, has a typical value of 0.1%.

In the present exemplary embodiment of the voltage monitoring device, not only the supply voltages, that is to say the output voltages of the two voltage regulators intrinsically, but also their ratio are monitored, which results not only in linear independence between the two voltage monitoring processes but also allows a tighter tolerance range to be defined than that of the two voltage regulators R1, R2. If the microcontroller is being monitored, this can be done without requiring any additional hardware components.

We claim:

1. In combination with an electronic component, a voltage monitoring device for monitoring two supply voltages including a larger supply voltage and a smaller supply voltage to be supplied to the electronic component, each of the supply voltages produced from an operating voltage supplied to a respective integrated voltage regulator and the respective integrated voltage regulator having a regulator voltage monitor for monitoring an output voltage of the respective integrated voltage regulator and the output voltage being one of the supply voltages supplied to the electronic component, the voltage monitoring device comprising:

a ratiometrically operating analog/digital converter having a reference input receiving the larger supply voltage, a measurement input receiving the smaller supply voltage, and an output, said ratiometrically operating analog/digital converter generating a digital value provided at said output; and a window comparator connected to said ratiometrically operating analog/digital converter and receiving the digital value, said window comparator comparing the digital value with predetermined limit values including an upper limit value and a lower limit value, said window comparator generating a reset signal if the digital value is greater than the upper limit value or is less than the lower limit value.

2. The voltage monitoring device according to claim 1, wherein the electronic component is a microcontroller and said ratiometrically operating analog/digital converter is integrated in said microcontroller, and said window comparator is performed by software in said microcontroller.

3. A circuit, comprising:

integrated voltage regulators receiving a supply voltage and outputting two supply voltages including a larger supply voltage and a smaller supply voltage, each of said integrated voltage regulators having a voltage monitor for monitoring the supply voltages, said voltage monitor having an analog/digital converter and a window comparator connected to said analog/digital converter, said integrated voltage regulators outputting a reset signal if one of the supply voltages being monitored is outside of a defined voltage range;

an electronic component, including:
- a ratiometrically operating analog/digital converter having a reference input receiving the larger supply voltage, a measurement input receiving the smaller supply voltage, and an output, said ratiometrically operating analog/digital converter generating a digital value provided at said output; and
- a further window comparator connected to said ratiometrically operating analog/digital converter and receiving the digital value, said further window comparator comparing the digital value with predetermined limit values including an upper limit value and a lower limit value, said further window comparator generating a further reset signal if the digital value is greater than the upper limit value or is less than the lower limit value.

4. The voltage monitoring device according to claim 3, wherein said electronic component is a microcontroller.

\* \* \* \* \*

UNITED STATES PATENT AND TRADEMARK OFFICE
CERTIFICATE OF CORRECTION

PATENT NO.   : 6,456,086 B1
DATED        : September 24, 2002
INVENTOR(S)  : Stephan Bolz et al.

It is certified that error appears in the above-identified patent and that said Letters Patent is hereby corrected as shown below:

<u>Title page,</u>
Item [30] should read as follows:

-- Foreign Application Priorty Data
Apr. 1, 1998    (DE) .......... 198 14 696.5 --

Signed and Sealed this

Twenty-eighth Day of January, 2003

JAMES E. ROGAN
*Director of the United States Patent and Trademark Office*